United States Patent
Terraneo

(10) Patent No.: US 6,655,375 B2
(45) Date of Patent: Dec. 2, 2003

(54) SOLAR THERMOACCUMULATOR

(75) Inventor: Livio Terraneo, Cantù (IT)

(73) Assignee: Energineering Di Del Duca Amelia, Cantu (IT)

(*) Notice: Subject to any disclaimer, the term of this patent is extended or adjusted under 35 U.S.C. 154(b) by 5 days.

(21) Appl. No.: 09/885,402

(22) Filed: Jun. 20, 2001

(65) Prior Publication Data

US 2001/0054419 A1 Dec. 27, 2001

(30) Foreign Application Priority Data

Jun. 22, 2000 (IT) .................................... CO2000A0016

(51) Int. Cl.[7] .................................................. F24J 2/44
(52) U.S. Cl. ...................... 126/639; 126/652; 126/635
(58) Field of Search ................................. 126/639, 623, 126/635, 638, 652, 906; 136/206

(56) References Cited

U.S. PATENT DOCUMENTS

| | | | | |
|---|---|---|---|---|
| 4,056,093 A | * | 11/1977 | Barger | 126/638 |
| 4,299,203 A | * | 11/1981 | Skopp | 126/638 |
| 4,416,257 A | * | 11/1983 | Bale | 126/639 |
| 4,505,261 A | * | 3/1985 | Hunter | 126/635 |
| 4,513,732 A | * | 4/1985 | Feldman, Jr. | 126/638 |
| 4,566,431 A | * | 1/1986 | Takeuchi et al. | 126/640 |
| 5,241,950 A | * | 9/1993 | Mahdjuri-Sabet | 126/639 |
| 6,370,328 B1 | * | 4/2002 | Mottershead | 126/639 |

FOREIGN PATENT DOCUMENTS

| | | | | |
|---|---|---|---|---|
| FR | 2 462 523 A | * | 3/1981 | |
| JP | 3-164668 A | * | 7/1991 | |

* cited by examiner

Primary Examiner—Henry Bennett
Assistant Examiner—Josiah C. Cocks
(74) Attorney, Agent, or Firm—Abelman, Frayne & Schwab

(57) ABSTRACT

A solar thermoaccumulator, including a parallel battery of closed-circuit vacuum solar pipes, and provided with a plurality of accumulation bulbs, which are either immersed in a primary conductive fluid that circulates in an annular chamber having an air space, whose internal wall is the containing wall of a reservoir containing a fluid to be heated; or are put in direct thermally conductive contact with tubular tangs that are attached to and inserted in a reservoir, is disclosed. The reservoir may be single reservoir, or may be associated with and sequentially in fluid communication with at least one other upstream, parallel aligned reservoir.

14 Claims, 3 Drawing Sheets

SOLAR THERMOACCUMULATOR

BACKGROUND OF THE INVENTION

1. Field of the Invention

The present invention relates to a solar thermoaccumulator. More particularly, the present invention relates to a solar thermoaccumulator of the type including a plurality or battery of closed-circuit vacuum heat pipes that transfer heat to a circuit to be heated.

2. Prior Art

Apparatuses capable of collecting solar energy and utilizing it for industrial and/or domestic purposes are already known. In particular, there are presently known and increasingly are being developed so-called solar panels, designed for heating water in houses or community facilities such as: hotels, gymnasiums, barracks, camping grounds, and the like. Such solar panels are substantially designed to function according to the process that exploits the physical law by which hot fluids naturally rise, while cold fluids tend to descend in the opposite direction. Some types of flat plate collectors or solar panels are constituted of flat, blackened, metal containers in whose inside a primary fluid flows in coiled pipes. Such panels are insulated at the bottom to prevent convection heat losses, include top blackened glass panels, and are so oriented as to ensure the perpendicularity of their surface with respect to the average direction of the sun's rays.

Solar rays, both direct and diffuse, going through the thickness of glass, heat the metal surface of the connector and, as a consequence, also the fluid flowing in the coils. The primary fluid, once heated, flows upwards, always due to natural convection (and sometimes also due to forced convection, such as when pumped), travels a circuit that includes a heat exchanger and heats a fluid, typically water, contained in an accumulation reservoir connected to the distribution system.

These apparatuses, although functioning according to a valid principle, have a limited yield of approximately 50% which, although obtained by exploiting the entirely cost-free resource of solar energy, is actually cost disadvantageous when one considers amortization of the high capital costs of the panels themselves.

Solar collectors that utilize the solar pipe technique, which have a higher yield are also known. Such solar pipes include an absorbing plate bonded to a heat pipe, with the assembly being sealed within an evacuated glass pipe, and the heat pipe being coupled to a condenser. Solar radiation striking the plate is absorbed and then transferred as thermal energy to the condenser. The absorbing plate is coated with a special high efficiency selective coating, which ensures the maximum radiation absorption and minimum thermal radiation losses. Heat, which cannot scatter due to the internal vacuum condition, is transmitted without appreciable scattering to an adjoining tubular body, provided with an intermediate wall that separates the delivery circuit from the return circuit of the primary fluid. By exploiting the same physical principle of upward natural circulation of hot fluids from down upwards, and orienting the collecting plates of the solar pipes inclined and perpendicular with respect to the average direction of the sun's rays, the heated primary fluid can be exploited in a different way. In one case, the upper part of each solar pipe includes hydraulic taps through which the heated fluid is connected to a heat exchanger that heats the water contained in an accumulation reservoir that is, in turn, connected to the distribution systems. In another case, the upper accumulation bulbs of the solar pipes are, alternatively, adheringly engaged, with heat transmission by convection and conduction, in corresponding profiled niches, obtained on the same piping of the circuit of the heat exchanger.

Although the adoption of solar pipes has allowed the realization of marked increases in yield and efficiency, and has allowed the development of solar panels even in regions with reduced sun exposure, the present configuration of such units is still complex and expensive from the point of view of construction, installation, and maintenance. A further drawback lies in the fact that present solar panels have a limited capacity.

SUMMARY OF THE INVENTION

Accordingly, one object of the present invention is to eliminate the above drawbacks. More particularly, it is a further object of the present invention to provide a solar thermoaccumulator, which, besides having high thermal yields and efficacy, is easily realizable and has a very reduced cost to manufacture.

According to the present invention, these and still other objects are achieved by a solar thermoaccumulator that includes a plurality or battery of closed-circuit vacuum solar pipes, with each pipe being coupled to a heat accumulation bulb or condenser, a reservoir containing a fluid to be heated, circumscribed by a shell and provided with fluid feeding pipes and discharge pipes, and a means for transferring heat from the heat accumulation bulbs to the fluid to be heated, wherein the heat accumulation bulbs or condensers are mounted on the lower surface of the shell of the reservoir containing the fluid to be heated.

According to a preferred embodiment of the present invention, the reservoir containing the fluid to be heated is provided with a peripheral, annular, enveloping chamber having an air space, whereto the primary conductive liquid is caused to flow and the heat accumulation bulbs or condensers are immersed in said primary conductive liquid.

According to another preferred embodiment of the present invention, the lower surface of the reservoir; containing the fluid to be heated, is provided with tubular, parallel and aligned tangs, and the heat accumulating bulbs or condenser are placed in direct thermal conduction touch with the tangs.

The reservoir containing the fluid to be heated may be a single reservoir, having preferably a horizontal orientation, or it may be associated with other reservoirs, horizontal, parallel aligned and communicating with each other through slits or longitudinal ports.

The advantages achieved by the solar thermoaccumulator of the present invention lie essentially in that the connections of the accumulation bulbs of the closed-circuit vacuum solar pipes with the reservoirs are much simpler to construct and more accessible for both the assembly and maintenance operations, and besides the mutual association of heat transfer is caused to be more effective, with a higher yield. Another advantage lies in that, as the minimum overall dimensions increase, marked increases in the heated fluid capacity are obtained.

BRIEF DESCRIPTION OF THE DRAWINGS

The constructive and functional characteristics of the solar thermoaccumulator of the present invention will be better understood from the following description, wherein reference is made to the figures of the attached drawings that. represent preferred non-limiting examples of embodiments of the invention, and wherein:

FIG. 7 shows the schematic side view of a solar thermoaccumulator according to the present invention, having a double reservoir, located on a frame to be placed on the ground, terraces, or the like.

DETAILED DESCRIPTION OF PREFERRED EMBODIMENTS OF THE INVENTION

Figure 1:
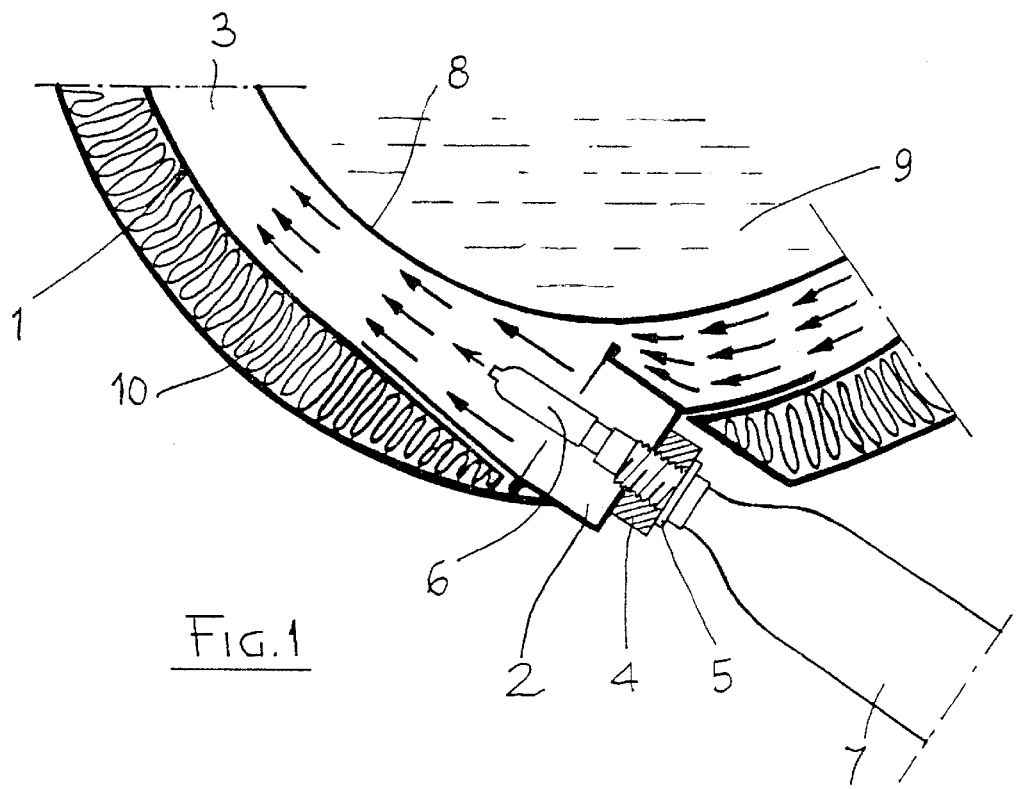
FIG. 1 shows a schematic partial view of a cross-section of a solar thermoaccumulator with the accumulation bulbs immersed in the closed-circuit primary conductive fluid.

FIG. 1 relates to a first example of an embodiment of a fluid indirect-heating thermoaccumulator. In this embodiment, a reservoir containing the fluid to be heated, having preferably a horizontally oriented cylindrical shape, includes a plurality of lower unions 2. The unions 2 are equidistant throughout the longitudinal lower extension of the container 9, with an alignment substantially tangential to an annular peripheral chamber 3 containing a thermally conductive primary fluid. The annular chamber 3 is circumscribed by an external wall 1 and an internal wall 8, in touch with the fluid to be heated.

On the lower unions 2, there are attached by screws 4 and with sealing gasket 5, a plurality of condensers or accumulation bulbs 6, of at least a parallel battery of closed-circuit vacuum solar pipes 7. The condensers 6 are immersed in and in direct contact with the conductive fluid that circulates in the annular chamber 3, such as, for example, water or other suitable conductive liquids.

The fluid is contained in chamber 3, is recirculated in a closed-circuit, is heated when it contacts bulbs 6, flows upwards under natural convection-induced motion along the peripheral chamber 3, progressively transfers its heat content to an internal part 8 of reservoir 9, flows downward once cooled, along an opposite side of the chamber 3 and recontacts bulbs 6, to be reheated again for the next cycle.

The heat, which the fluid transfers to the internal walls 8, is transferred by the latter to the water to be heated contained in reservoir 9. The external wall 1 of chamber 3 is sufficiently covered with an insulating material 10, to reduce heat losses to the outside as much as possible and to convey all the thermal exchange of the primary fluid towards the internal wall 8.

The closed-circuit vacuum solar pipes 7 are oriented and inclined to obtain a position substantially perpendicular to the average direction of the sun's rays.

Figure 2:
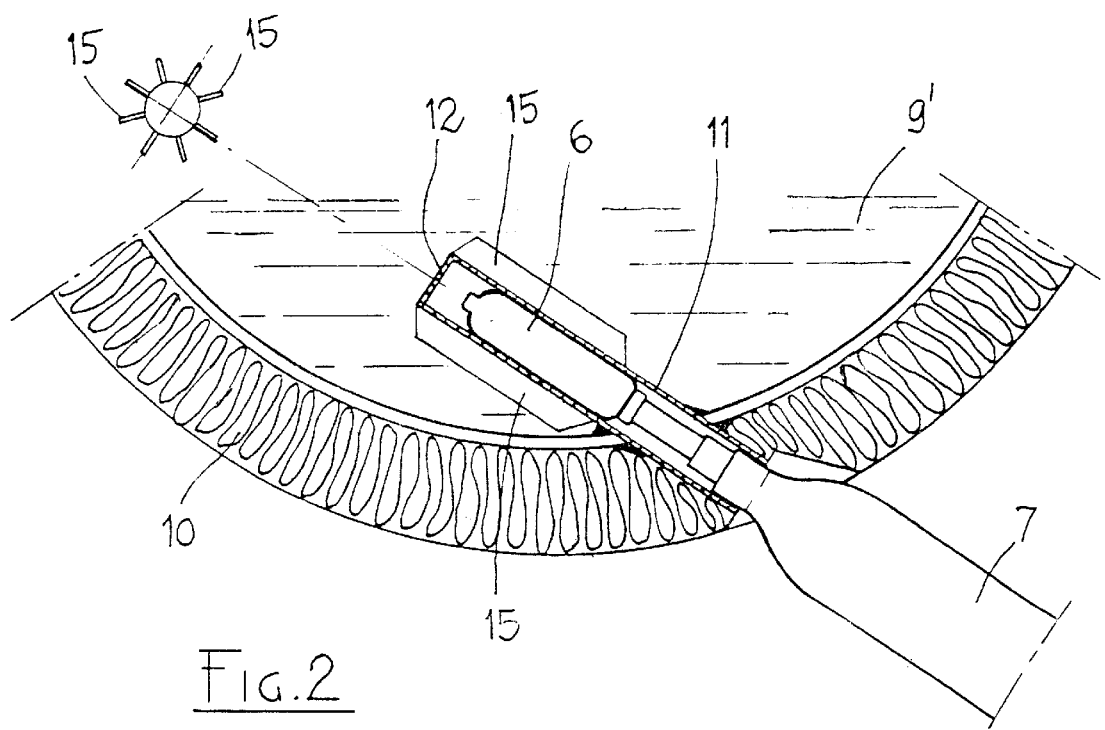
FIG. 2 shows the schematic partial view of a cross-section of a solar thermoaccumulator according to the present invention, with the accumulation bulbs associated to the tubular tangs that are integral with the shell constituting the reservoir.
Figure 3:
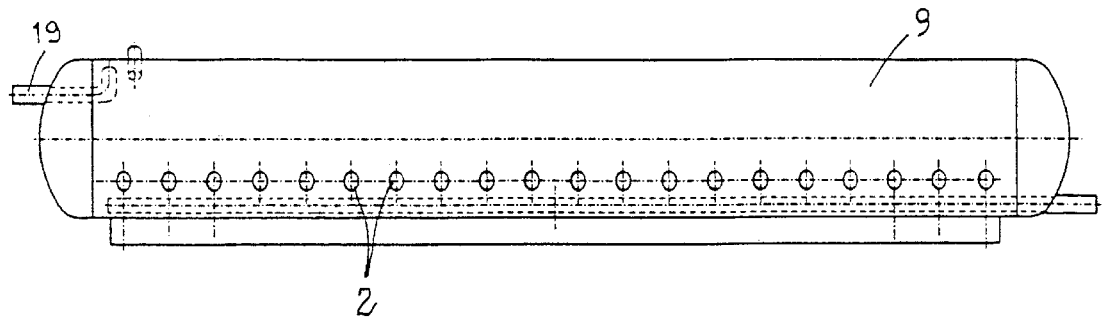
FIG. 3 shows the schematic front view of a thermoaccumulator reservoir according to the present invention, wherein the position of the connection tangs for the bulbs of the solar pipes is emphasized.
Figure 4:
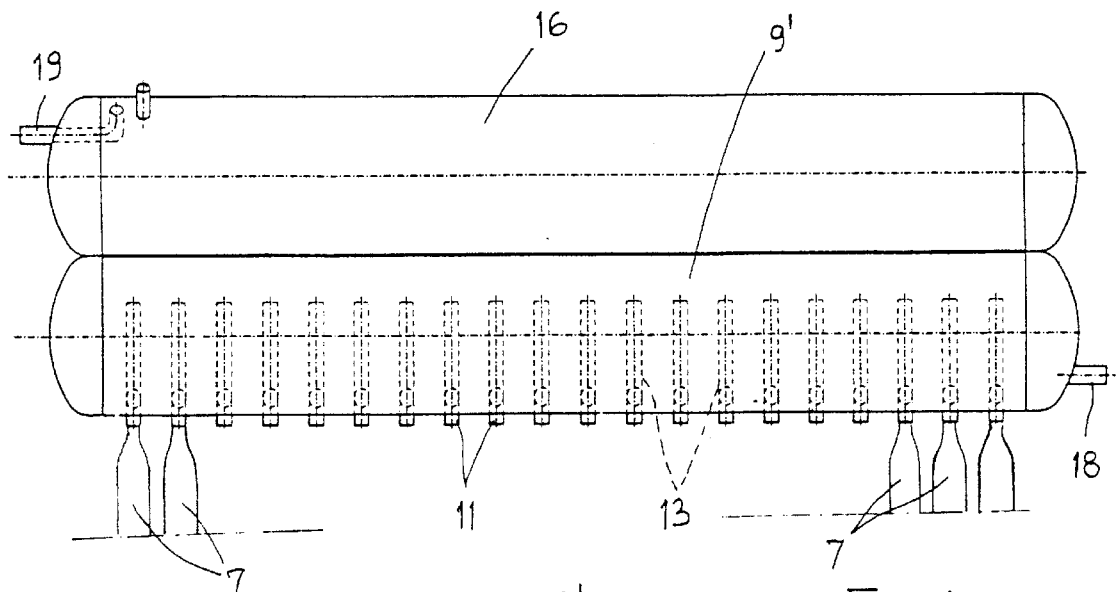
FIG. 4 shows the schematic plan view of a thermoaccumulator according to the present invention, wherein there the position of the solar pipes with respect to the reservoir formed by several sequential tubular bodies is emphasized.
Figure 5:
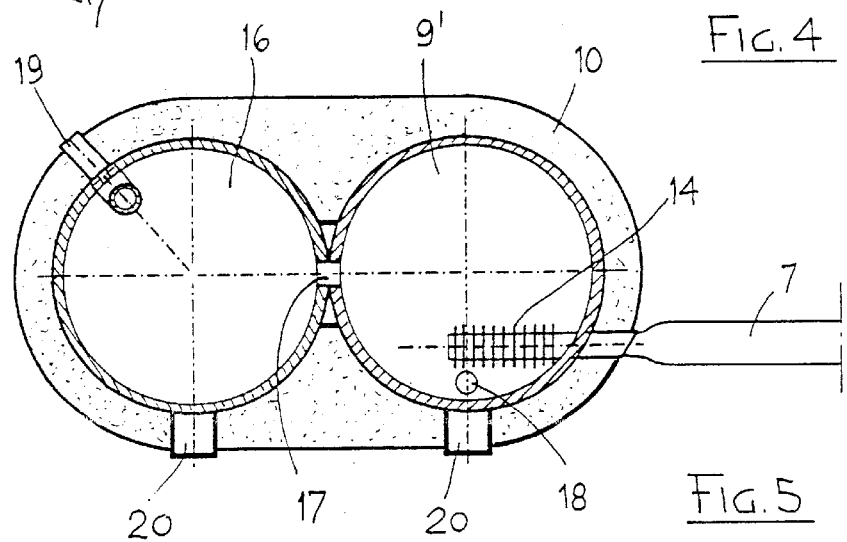
FIG. 5 shows the schematic view of the cross-section of a thermoaccumulator according to the present invention having two sequential tubular bodies.
Figure 6:
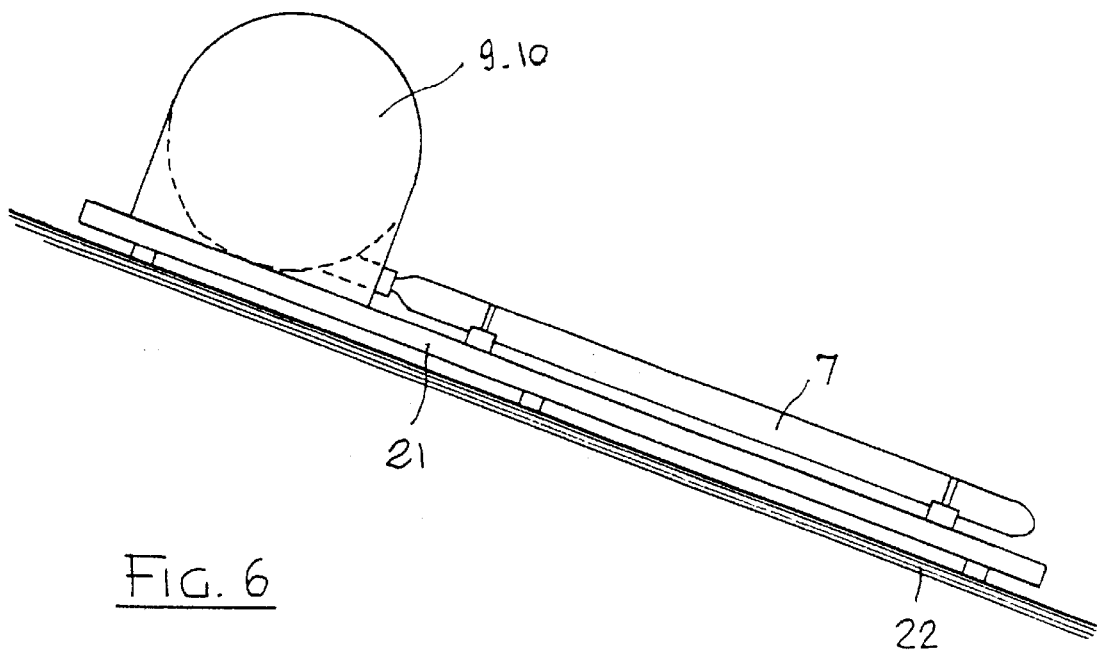
FIG. 6 shows the schematic side view of a thermoaccumulator according to the present invention, having a single reservoir, located on a pitched roof.
Figure 7:
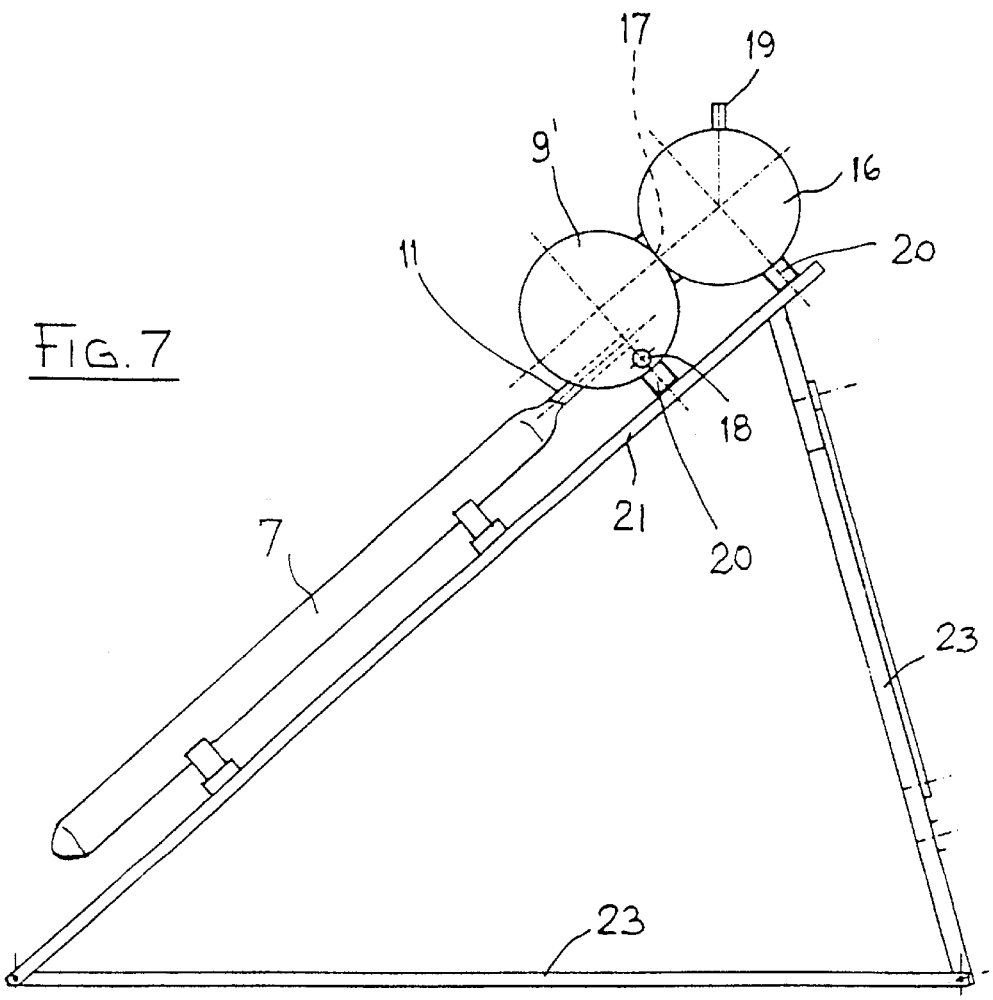

FIG. 2 relates to a second example of the water direct heating thermoaccumulator of the present invention. In this embodiment, reservoir 9', having preferably but not essentially, a horizontally orientated cylindrical shape, includes a plurality of internal tangs 11, which are equidistant throughout the longitudinal lower extension of reservoir 9'. Tangs 11 are open towards the outside, while their ends 12, extending into the reservoir, are sealed. The active ends or accumulation bulbs or condensers 6 of at least a battery of a plurality of closed-circuit vacuum solar pipes 7, arranged in parallel, engage and get in contacting relation with the internal part of the corresponding tangs 11, and through them, they transfer the heat accumulated in the water contained in reservoir 9'.

In order to ensure that heat transmission takes place in the most efficient manner, substantially through the mechanism of conduction, bulbs 6 and tangs 11 are fabricated from different materials having a different coefficient of thermal expansion. For example, bulbs are made from copper and tangs from steel, since copper has a linear thermal expansion coefficient higher by about 50% than that of steel. This allows the fabrication of both components with dimensions that are sufficient to ensure their cold coupling with a clearance, and when heated, the clearance between the components is entirely eliminated due to the different linear expansion of the materials, so that complete contact between the components then occurs. The same tangs 11, may be fabricated, depending on the characteristics of the thermoaccumulators, such that their surfaces, which are in contact with the fluid to be heated, are alternatively either smooth 13, or have parallel annular fins 14, or radial fins 15.

At least one other reservoir may be associated upstream 16 with reservoir 9 or 9', such other reservoir(s) having the same volume or a different volume, and being aligned and parallel, and raised with respect to an inclination provided for correct alignment with the direction of the sun's rays. This allows an increase in the capacity of hot water accumulation of reservoir 9 or 9', while, in any case, maintaining the overall external size of the corresponding thermoaccumulator within acceptable limits, without increasing its diameter, so as to restrain the non harmonic effects caused by its size, especially when it is located on a structure such as a house roof The connection between the main reservoir 9 or 9' and the auxiliary reservoir(s) 16 takes place through the longitudinal slits 17 created in a zone of sealing coupling. The water in the auxiliary reservoirs, heated by the direct or indirect heat sources, also flows upwards, while cold air flows downwards, due to natural convective forces.

The figures schematically indicate the feeding pipes 18, for water to be heated, located in the lower part, and the discharge pipes 19 for the heated water, located in the upper part.

Reservoirs 9, 9', with insulation 10, and closed-circuit vacuum solar pipes 7, are provided with supports 20 for attachment to fixed frames 21, which, in turn, can be oriented and positioned for attachment to pitched roofs 22, or adjustable frames 23.

In all the embodiments of the present invention, the thermoaccumulators may be provided with electric resistances for possible supplemental heat input in case of long periods of bad weather when there is little or no sunshine. Although the present invention has been described above with reference to a number of preferred illustrative embodiments, it will be apparent to a person of ordinary skill in the art that many alternatives and variants of the foregoing are also possible in light of. the above description. Therefore, the present invention is intended to include all such alternative and variant embodiments that are within the scope of the invention as defined according to the following set of claims.

What is claimed is:

1. A solar thermoaccumulator comprising:

a plurality of closed-circuit vacuum solar tubes (7), each solar tube being coupled to at least one of a plurality of heat accumulation bulbs or condensers (6);

at least one first reservoir (9, 9') containing the fluid to be heated, circumscribed by a shell and provided with fluid feeding pipes (18) and discharge pipes (19) of the heated fluid, wherein each of the at least one first reservoir (9, 9') containing the fluid to be heated is provided with a peripheral, annular, enveloping chamber (3) having an air space, whereto a primary conductive liquid is caused to flow, and the heat accumulation bulbs or condensers (6) are immersed in the primary conductive liquid, wherein the annular chamber (3) is circumscribed by an internal wall (8) in touch with the fluid to be heated, and by an external wall (1); and means to transfer heat from the heat accumulation bulbs or condensers (6) to the fluid to be heated;

wherein the heat accumulation bulbs or condensers (6) are mounted throughout a lower longitudinal extension of the shell of the reservoir (9, 9') containing the fluid to be heated.

2. The solar thermoaccumulator according to claim 1, wherein the external wall (1) of the annular chamber (3) is provided with a plurality of unions (2) equidistant throughout its lower longitudinal extension with a substantially tangential alignment, and the accumulation bulbs or condensers (6) are tied to the unions (2).

3. The solar thermoaccumulator according to claim 1, wherein at least one of the reservoirs (9, 9') containing the fluid to be heated is provided with parallel tubular tangs (11), aligned and equidistant, located throughout the lower longitudinal extension, and the heat accumulation bulbs or condensers (6) are put in direct thermal conduction touch with the tangs (11).

4. The solar thermoaccumulator according to claim 3, wherein each of the tangs (11) includes a plurality of ends, with a first end of each tang being open towards the outside, and with a second end of each tang (11) internal with respect to the reservoir (9, 9') being sealed.

5. The solar thermoaccumulator according to claim 3, wherein each of the heat accumulation bulbs or condensers (6) and the tubular tangs (11) are made from materials having a different coefficient of thermal expansion.

6. The solar thermoaccumulator according to claim 5, wherein the heat accumulation bulbs or condensers (6) are made from copper, and the tubular tangs (11) are made from steel.

7. The solar thermoaccumulator according to claim 6, wherein the tangs (11) have a surface in touch with the liquid (13) to be heated, the surface being either smooth, or provided with parallel annular fins (14) or radial fins (15).

8. The solar thermoaccumulator according to claim 7, wherein at least one second reservoir (16) is coupled in an aligned and parallel position with the at least one first reservoir (9, 9');

with the reservoirs (9, 9', 16) being connected with each other by longitudinal slits (17) obtained in the coupling zone.

9. The solar thermoaccumulator according to claim 8, wherein the reservoirs (9, 9', 16) are coated with an insulating material (10).

10. The solar thermoaccumulator according to claim 4, wherein each of the heat accumulation bulbs or condensers (6) and the tubular tangs (11) are made from materials having a different coefficient of thermal expansion.

11. The solar thermoaccumulator according to claim 10, wherein the heat accumulation bulbs or condensers (6) are made from copper, and the tubular tangs (11) are made from steel.

12. The solar thermoaccumulator according to claim 11, wherein the tangs (11) have a surface (13) in touch with the liquid to be heated, the surface being either smooth, or provided with parallel annular fins (14) or radial fins (15).

13. The solar thermoaccumulator according to claim 12, wherein at least a second reservoir (16) is coupled in an aligned and parallel position with the at least one first reservoir (9, 9');

with the reservoirs (9, 9', 16) being connected with each other by longitudinal slits (17) obtained in the coupling zone.

14. The solar thermoaccumulator according to claim 13, wherein the reservoirs (9, 9', 16) are coated with an insulating material (10).

* * * * *